United States Patent
Jackson

[11] Patent Number: 6,026,548
[45] Date of Patent: Feb. 22, 2000

[54] ELASTIC SHOELACE AND FASTENER

[76] Inventor: Eric L. Jackson, 105 Sunset Dr., Glen Burnie, Md. 21060

[21] Appl. No.: 09/244,084

[22] Filed: Feb. 3, 1999

[51] Int. Cl.[7] .............................. A43C 7/00; A43C 9/00; F16G 11/00

[52] U.S. Cl. .......................... 24/712; 24/712.1; 24/715.3; 24/115 G

[58] Field of Search ................... 24/712, 712.1, 24/713, 713.6, 715.3, 715.4, 300, 115 G

[56] References Cited

U.S. PATENT DOCUMENTS

| | | | |
|---|---|---|---|
| 696,440 | 4/1902 | Holland | 24/715.4 |
| 943,607 | 12/1909 | Schelling | 24/715.3 |
| 1,465,754 | 8/1923 | Berolzheimer | 24/715.4 |
| 1,948,844 | 2/1934 | Dawes | 24/715.3 |
| 2,869,205 | 1/1959 | Kacowski | 24/715.3 |
| 3,059,518 | 10/1962 | Nelson . | |
| 3,080,867 | 3/1963 | Eichinger | 24/115 G |
| 4,423,539 | 1/1984 | Ivanhoe | 24/715.3 |
| 4,790,048 | 12/1988 | Arnt | 24/712.1 |
| 5,023,982 | 6/1991 | Mehan | 24/715.4 |
| 5,157,813 | 10/1992 | Carroll | 24/68 SK |
| 5,158,428 | 10/1992 | Gessner et al. | 24/712.9 |
| 5,335,401 | 8/1994 | Hanson | 24/712.5 |
| 5,572,778 | 11/1996 | Stenner | 24/712.9 |
| 5,613,283 | 3/1997 | Yusfan | 24/713 |
| 5,649,342 | 7/1997 | D'Andrade et al. | 24/712.2 |
| 5,657,557 | 8/1997 | Hull et al. | 36/58.5 |
| 5,852,857 | 12/1998 | Mark et al. | 24/713.6 |

*Primary Examiner*—Victor N. Sakran
*Attorney, Agent, or Firm*—Larry Guffey

[57] ABSTRACT

A system for securing a shoe, of the type having an upper part with a pair of opposed edges with eyelets which are drawn together in securing the shoe, onto the foot of a wearer is disclosed. In a preferred embodiment the system comprises an elastic shoelace having a pair of ends, each end having an elongated, covering of an elastomeric material, and a dual cord fastener adapted to allow shoelace ends to pass there through and to lock two prescribed points on the length of the shoelace from moving relative to the fastener.

5 Claims, 3 Drawing Sheets

ELASTIC SHOELACE AND FASTENER

BACKGROUND OF THE INVENTION

1. Field of the Invention

The present invention generally relates to methods and mechanisms for securing a shoe having laces on the foot of its wearer. More particularly, this invention relates to shoelaces and mechanisms for facilitating their use and closure.

2. Description of the Related Art

Shoelaces have been in widespread use for hundreds of years. The conventional shoelace is a smooth linear member made of cloth, leather or plastic. The shoe lace is wound through a series of holes arranged in the upper portion of the shoe so as to straddle the opening in the shoe through which the wearer's foot is inserted into or retracted from the shoe.

To use the shoelace, the foot is first inserted into the shoe. Then, the two ends of the shoelace are pulled so as to bring the openings in the shoe upper together, thereby tightening the shoe around the foot. The two ends of the shoelace are then tied so as to prevent the inadvertent loosening of the shoe.

Conventional shoelace arrangements suffer from a number of disadvantages. These include: (1) the need to tie the ends of the shoelace together, with these ties often loosening during the wearing of the shoe, (2) the inability to configure the shoe upper to the foot so as to obtain a suitably snug fit, and (3) difficulties in feeding the shoelace ends through the evermore complex, shoelace eyelet geometries being introduced to improve the fit of the shoe.

The process of tying shoelace ends together is relatively time consuming and requires a certain amount of skill and manual dexterity which is not always present in shoelace users. For example, anyone watching a young child struggle with his or her shoelaces would appreciate the complexity of the task. Similarly, many elderly and incapacitated persons with impaired vision and/or impaired manual capabilities find it difficult or impossible to negotiate the intricate maneuvering involved in tying a shoelace.

Another disadvantage of tying the shoelace ends together in the conventional manner is the tendency for the tying knot to loosen and, in some cases, to become completely undone, requiring the retying of the shoelaces. This tendency apparently is a function of the cross-sectional shape of the shoelace and its material of construction. Changes by shoemakers from shoelaces having elongated rectangular (nearly flat) to round cross-sections (primarily for aesthetic reasons), and from cotton to polyester and other slippery synthetics (primarily for economic reasons), are reported to have greatly increased the difficulties that people encounter in keeping their shoelaces tied.

As reported in the *The Wall Street Journal*, Jan. 28, 1998, page A1, not even professionals are immune: "Running in the November 1997 New York City Marathon, Kenyan John Kagwe had the laces on his Nike Air Streak running-shoes come untied three times. Twice he stopped to retie, and then went into a sprint to catch up with the leaders. The third time, he just kept running, with one lace flapping, and he won the race. But Mr. Kagwe missed setting a New York record by eleven seconds. His Nike laces were round nylon. "Did we screw up?" Kurt Richardson, running shoe chief at the Beaverton, Oreg. sneaker giant, asks himself. "Yes, we did." Nike Inc. decided to give Mr. Kagwe, who is paid to wear the brand, the extra ten thousand dollars he was to receive if he broke the New York record."

Many U.S. patents have been directed to providing improved fastening systems for shoelaces. For example, see U.S. Pat. Nos. 5,157,813, 5,158,428, 5,335,401, 5,572,778, 5,613,283, 5,649,342, 5,657,557 and 5,852,857. Although these patents disclose a wide variety of fasteners, none of these addresses all of the disadvantages listed above.

Despite this prior art, there is a widely recognized need for an improved system for securing a laced shoe on the foot of its wearer—a system that will promote a snugger fit of the shoe, avoid the need to tie shoelace ends, eliminate unwanted shoelace loosening, and reduce shoelace lacing problems.

SUMMARY OF THE INVENTION

The present invention is generally directed to satisfying the needs set forth above and the problems identified in the prior arts. The problems of ill-fitting shoe uppers and tied shoelace ends are resolved by the present invention.

In accordance with one preferred embodiment of the present invention, the foregoing need can be satisfied by providing a system for securing a shoe onto the foot of a wearer, the shoe having an upper part with a pair of opposed edges with eyelets which are drawn together in securing the shoe onto the foot, the system comprising: (1) an elastic shoelace having a pair of ends, each end having an elongated, covering of an elastomeric material, with this covering configured into a cylindrical shape with the longitudinal axis of such a cylindrical shape having a specified radius of curvature so as to promote the ease with which a shoelace end can be threaded through a shoe's eyelets, and (2) a dual cord fastener adapted to allow shoelace ends to pass there through and to lock two prescribed points on the length of the shoelace from moving relative to the fastener.

In another preferred embodiment, the elastic shoelace comprises a plurality of parallel elastic strands having an outer wrapping of woven polymeric fibers.

In another preferred embodiment, the dual cord fastener comprises: (a) a base unit having front, rear and side surfaces, a pair of spaced unit passages extending between the front and rear surfaces, each unit passage adapted to receive and allow a shoelace end to pass there through, (b) a slot projecting from the side surface into the base unit and having a slot end interior surface, this slot adapted to laterally transverse a portion of the volume defined by the unit passages, (c) a slot member having top and bottom ends and front and rear surfaces, this member slidably mounted in the slot and having a pair of spaced member passages extending between the member front and rear surfaces, and (d) a spring biasing means adjacent the slot end interior surface and connected to the slot member bottom end for urging the member from the slot, wherein the slot member is adapted so that at a point on its range of slidable motion the slot member passages align with the base unit passages so as to yield a pair of openings extending through the entire fastener, whereby a shoelace end introduced through an aligned unit and member passage is pinchable by the sides of these passages when the spring biasing means causes the member to slide within the slot so as to misalign the passages.

This new and improved shoelace fastening system is seen to achieve its objects of contributing to promoting a snugger fit of a shoe, avoiding the need to tie shoelace ends, eliminating shoelace loosening, and reducing shoelace lacing problems.

Other objects and advantages of this invention will become readily apparent as the invention is better understood by reference to the accompanying drawings and the detailed description that follows.

DESCRIPTION OF THE PREFERRED EMBODIMENT

Figure 1A:
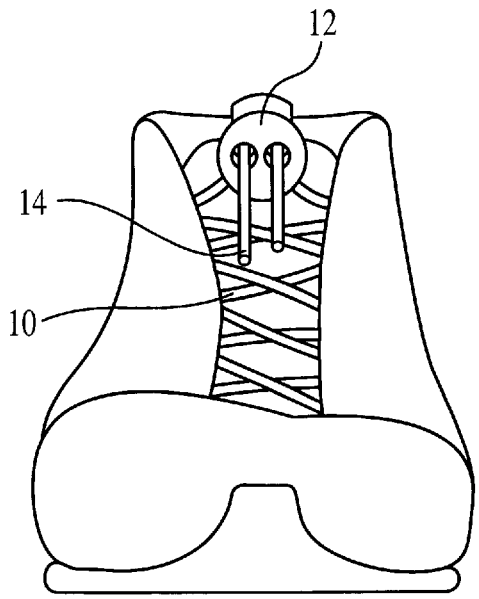
FIG. 1A and FIG. 1B are a perspective view of an athletic shoe with the shoe securing system of the present invention.
Figure 1B:
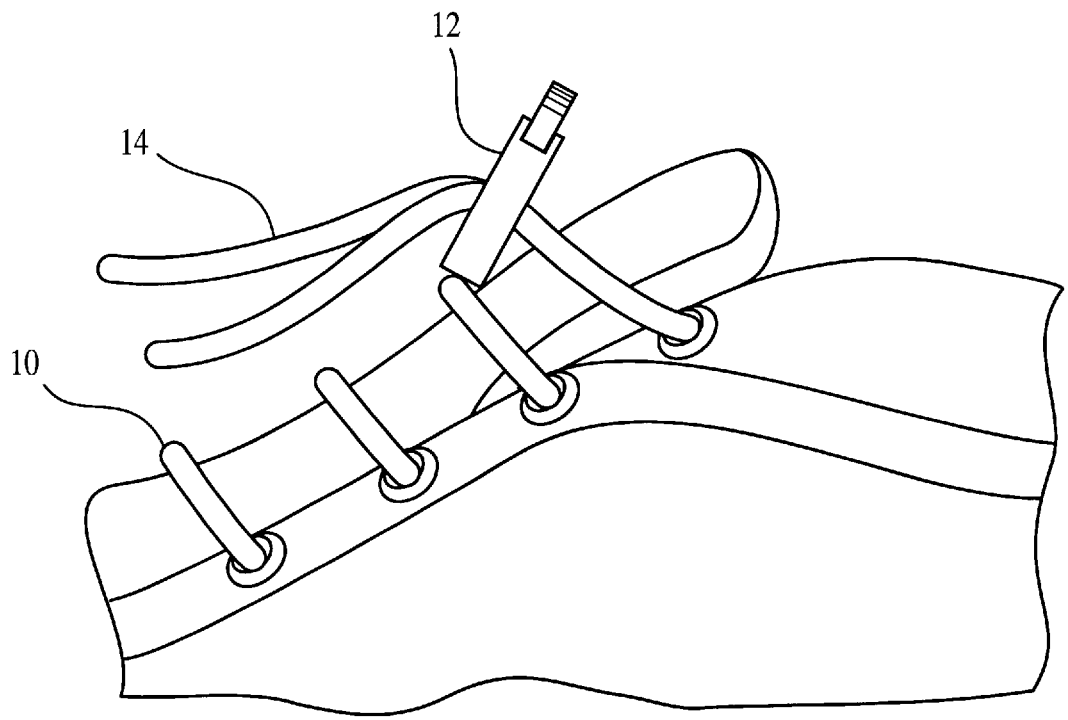

Referring now to the drawings wherein are shown preferred embodiments and wherein like reference numerals designate like elements throughout, there is shown in FIG. 1 a perspective view of an athletic shoe with the shoe securing system of the present invention.

As shown in FIG. 1, the shoe for use with the present invention has an upper part with a pair of opposed edges with eyelets which are drawn together in securing the shoe onto the foot. The shoe securing system itself comprises an elastic shoelace 10 and a dual cord fastener 12.

Figure 2:
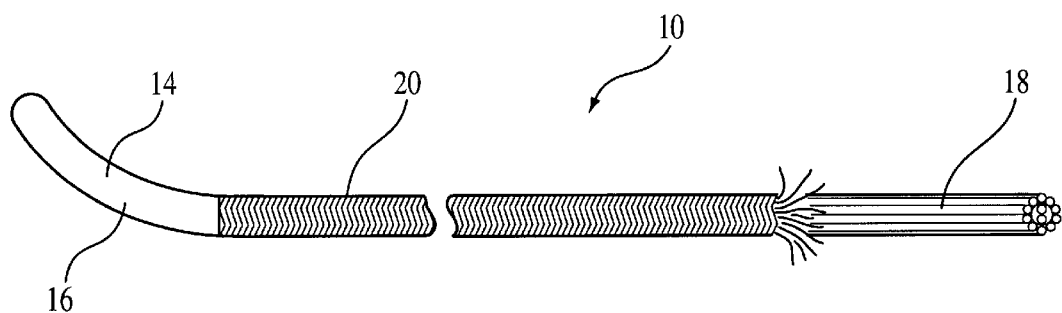
FIG. 2 is a side view of a preferred embodiment of the elastic shoelace of the present invention.

FIG. 2 shows a preferred embodiment of the elastic shoelace 10 of the present invention. It is seen to have a pair of ends 14, each of which has an elongated, covering 16 of an elastomeric material which is configured into a cylindrical shape with its longitudinal axis having a specified radius of curvature so as to promote the ease with which the shoelace end can be threaded through a shoe's eyelets. The shoelace itself is seen to comprise a plurality of parallel elastic strands 18 having an outer wrapping 20 of woven polymeric fibers.

Elastic shoelaces such as those described above are available from a number of commercial sources, such as Hickory Brands Inc., Hickory, N.C. For use with the present invention, round, one-eighth inch diameter, elastic shoelaces, with acetate tips, approximately three-fourths of an inch in length and having a radius of curvature of between one-half to one inch, have been found to be satisfactory for use with the present invention.

Figure 3:
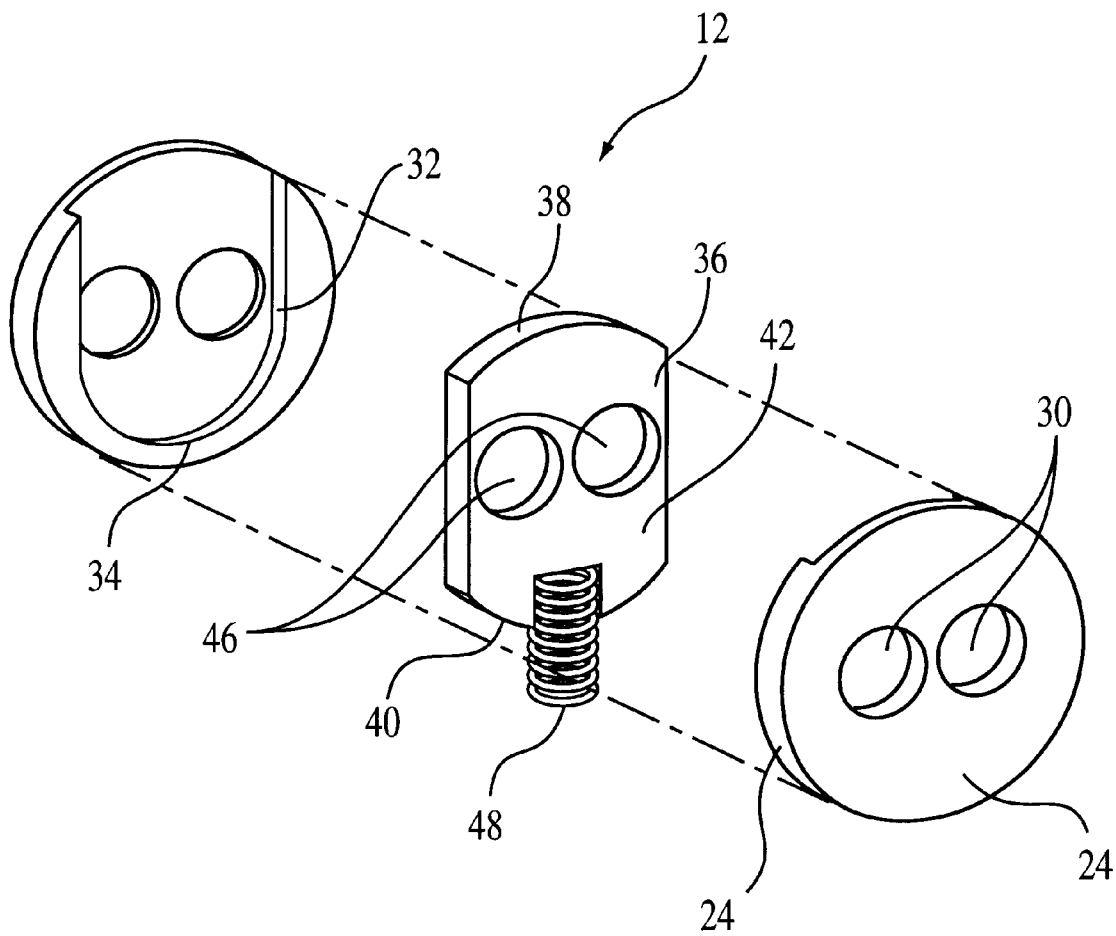
FIG. 3 is an exploded view of the shoelace fastener of the present invention.

FIG. 3 is an exploded view of a dual cord fastener 12 appropriate for use with the present invention. Such fasteners are available from a number of commercial sources, including U.S. Slide Fasteners, Inc., Boston, Mass.

It is seen to comprise: (a) a base unit 22 having front 24, rear 26 and side 28 surfaces, a pair of spaced unit passages 30 extending between the front 24 and rear 26 surfaces, each unit passage 30 adapted to receive and allow a shoelace end 14 to pass there through, (b) a slot 32 projecting from the side surface 28 into the base unit 22 and having a slot end interior surface 34, the slot 32 adapted to laterally transverse a portion of the volume defined by the unit passages 30, (c) a slot member 36 having top 38 and bottom 40 ends and front 42 and rear 44 surfaces, the member 36 slidably mounted in the slot 32 and having a pair of spaced member passages 46 extending between the member front 42 and rear 44 surfaces, and (d) a spring biasing means 48 adjacent the slot end interior surface 34 and connected to the slot member bottom end 40 for urging the member 36 from the slot 32, wherein the slot member 36 is adapted so that at a point on its range of slidable motion the slot member passages 46 align with the base unit passages 30 so as to yield a pair of openings extending through the entire fastener 12, whereby a shoelace end 14 introduced through an aligned unit 30 and member passage 46 is pinchable by the sides of these passages when the spring biasing means 48 causes the member 36 to slide within the slot 32 so as to misalign the passages.

Figure 4A:
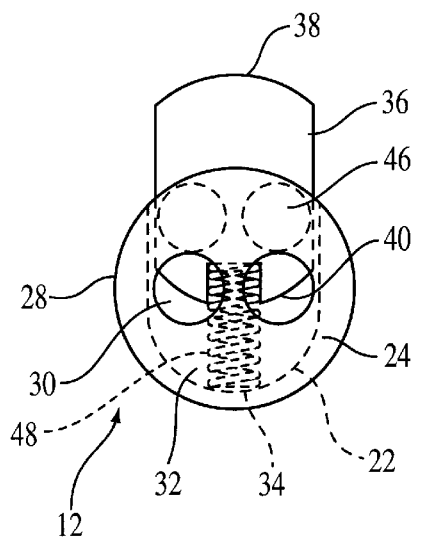
FIG. 4A to FIG. 4C are views of a preferred embodiment for the shoelace fastener of the present invention wherein its slidable member is at different points along its range of motion within the base unit's slot.
Figure 4B:
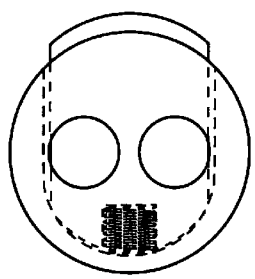
Figure 4C:
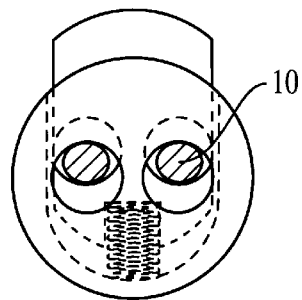

Operation of such a fastener is shown in FIG. 4A to FIG. 4C. These views show the slidable member 36 at different points along its range of motion within the base unit's slot 32, with FIG. 4C showing the fastener 12 in a position so as to lock the fastener at a particular point along the length of the shoelace 10.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

I claim:

1. A system securing a shoe onto the foot of a wearer, the shoe having an upper part with a pair of opposed edges to be drawn together in securing the shoe onto the foot, said upper having a plurality of openings, such as eyelets, therein and adjacent each of said edges, said system comprising:

an elastic shoelace having a pair of ends, each said end having an elongated, covering of an elastomeric material, the elongated covering being configured into a cylindrical shape with the longitudinal axis of said shape having a specified radius of curvature so as to promote the ease with which said shoelace end can be threaded through said shoe's eyelets, and a dual cord fastener having a pair of passages adapted to allow said shoelace ends to pass there through and to lock two prescribed points on the length of said shoelace from moving relative to said fastener.

2. A system for securing a shoe onto the foot of a wearer as recited in claim 1, wherein:

said elastic shoelace comprising a plurality of parallel elastic strands having an outer wrapping of woven polymeric fibers.

3. A system for securing a shoe onto the foot of a wearer as recited in claim 2, wherein said dual cord fastener comprising:

a base unit having front, rear and side surfaces, a pair of spaced unit passages extending between said front and rear surfaces, each said unit passage adapted to receive and allow a shoelace end to pass there through, a slot projecting from said side surface into said base unit and having a slot end interior surface, said slot adapted to laterally transverse a portion of the volume defined by said unit passages, a slot member having top and bottom ends and front and rear surfaces, said member slidably mounted in said slot and having a pair of spaced member passages extending between said member front and rear surfaces, and a spring biasing means adjacent said slot end interior surface and connected to the slot member bottom end for urging the member from the slot, wherein the slot member is adapted so that at a point on its range of slidable motion the slot member passages align with the base unit passages so as to yield a pair of openings extending through the entire fastener, whereby a shoelace end introduced through an aligned unit and member passage is pinchable by the sides of these passages when the spring biasing means causes the member to slide within the slot so as to misalign the passages.

4. A system for securing a shoe onto the foot of a wearer as recited in claim 1, wherein said dual cord fastener comprising:
- a base unit having front, rear and side surfaces, a pair of spaced unit passages extending between said front and rear surfaces, each said unit passage adapted to receive and allow a shoelace end to pass there through,
- a slot projecting from said side surface into said base unit and having a slot end interior surface, said slot adapted to laterally transverse a portion of the volume defined by said unit passages,
- a slot member having top and bottom ends and front and rear surfaces, said member slidably mounted in said slot and having a pair of spaced member passages extending between said member front and rear surfaces, and
- a spring biasing means adjacent said slot end interior surface and connected to the slot member bottom end for urging the member from the slot, wherein the slot member is adapted so that at a point on its range of slidable motion the slot member passages align with the base unit passages so as to yield a pair of openings extending through the entire fastener,
- whereby a shoelace end introduced through an aligned unit and member passage is pinchable by the sides of these passages when the spring biasing means causes the member to slide within the slot so as to misalign the passages.

5. A system for securing a shoe onto the foot of a wearer, the shoe having an upper part with a pair of opposed edges to be drawn together in securing the shoe onto the foot, said upper having a plurality of openings, such as eyelets, therein and adjacent each of said edges, said system comprising:
- an elastic shoelace having a pair of ends, each said end having an elongated, covering of an elastomeric material,
- a dual cord fastener adapted to allow shoelace ends to pass there through and to lock two prescribed points on the length of said shoelace from moving relative to said fastener,
- wherein said dual cord fastener comprising: a base unit having front, rear and side surfaces, a pair of spaced unit passages extending between said front and rear surfaces, each said unit passage adapted to receive and allow a shoelace end to pass there through,
- a slot projecting from said side surface into said base unit and having a slot end interior surface, said slot adapted to laterally transverse a portion of the volume defined by said unit passages,
- a slot member having top and bottom ends and front and rear surfaces, said member slidably mounted in said slot and having a pair of spaced member passages extending between said member front and rear surfaces, and
- a spring biasing means adjacent said slot end interior surface and connected to the slot member bottom end for urging the member from the slot, wherein the slot member is adapted so that at a point on its range of slidable motion the slot member passages align with the base unit passages so as to yield a pair of openings extending through the entire fastener,
- whereby a shoelace end introduced through an aligned unit and member passage is pinchable by the sides of these passages when the spring biasing means causes the member to slide within the slot so as to misalign the passages.

* * * * *